Feb. 25, 1964     L. F. CUTTINO     3,121,969
FLY AND WEED GUARD COMBINED
Filed Oct. 9, 1962

Lawrence F. Cuttino
INVENTOR.

BY
Attorneys

_United States Patent Office_ 3,121,969
Patented Feb. 25, 1964

3,121,969
FLY AND WEED GUARD COMBINED
Lawrence F. Cuttino, P.O. Drawer 1340, Sumter, S.C.
Filed Oct. 9, 1962, Ser. No. 229,301
2 Claims. (Cl. 43—42.1)

The present invention relates to an artificial fishing fly and a novel weed guard which is mounted on and carried by the leading end of the fly and which functions, broadly construed, to prevent weeds, underwater roots, branches and similar debris from fouling and interfering with the effectiveness of the barbed hooks which are embodied in the fly.

As will be hereinafter more fully recognized the invention constitutes an advance in the art in that it is characterized by a fly which is in and of itself conventional in construction but which is rendered more effective and reliable in action when the leading end thereof is collared by or appropriately equipped with the herein disclosed novel guard.

To the ends desired the guard is preferably star-like in configuration and appearance. It is such in construction that it may be molded from suitable pliant plastic material having prescribed bendably resilient properties. The guard is light in weight and does not detract from the expected utility of the fly. Because of the shape employed the guard does not promote undesirable resistance to satisfactory movement of the overall device through the water.

Briefly summarized the invention, in a combination sense, has to do with a fish attracting lure, preferably a simple fly. This fly comprises a multiple pronged fishhook of a type having a line attaching eye at the leading end of the shank. A bucktail made of suitable hackle is tied by appropriate tightly bound windings to the shank in a manner to provide a forwardly tapering ferrule. The ferrule is fittingly secured to the rear central portion of the hub-like body of the guard and, to the ends desired the body has an axial linearly straight slot which provides for anchoring of the eye of the hook to said body.

More specifically, novelty is predicated on the readily applicable and removable plastic or rubber weed guard characterized by a generally circular hub-like body with a slot, said body having a marginal portion provided with outstanding radial circumferentially spaced bendably resilient fingers. The fingers radiating from the periphery of the body provide the desired star-like form.

Then, too, novelty is predicated on providing the hub-like body on the rearwardly facing side with a pair of diametrically opposite lugs, said lugs having an intervening space, and said space in conjunction with the lugs functioning to permit the ferrule of the fly to be wedge-fitted and frictionally held in place whereby to thus combine the fly and guard in a unique manner.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
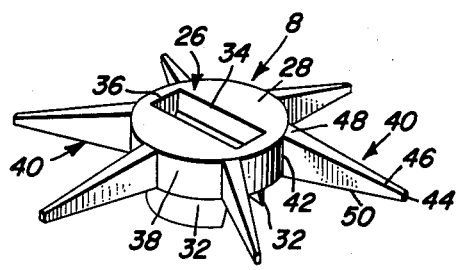
FIGURE 1 is a view in perspective of the weed guard by itself.
Figure 2:
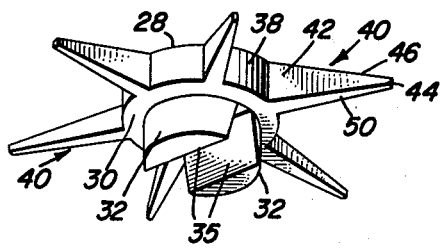
FIGURE 2 is a similar perspective view showing component parts thereof which are not clearly evident in FIG. 1.
Figure 3:
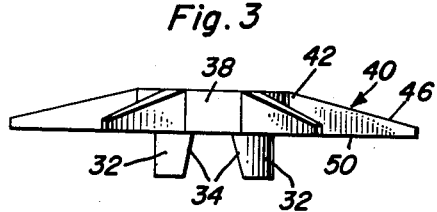
FIGURE 3 is an edge elevation which studied in conjunction with FIGS. 1 and 2, gives the edge elevation appearance of the weed guard.

With reference now to the views of the drawing the aforementioned artificial fishing fly (alternatively a hook-equipped lure or bug) is denoted by the numeral 6. The complemental attachable and detachable attachment therefor comprises a novel weed guard 8.

The fly comprises a shank 10 provided at its rearward or trailing end with a multiplicity of barbed hooks each including the hooks proper 12 having a forwardly projecting barbed hook 14. The line-attaching eye at the leading end of the shank is denoted by the numeral 16. The bucktail or equivalent attractive dress is denoted generally at 18 and comprises appropriate hackle or hairs 20 bunched together at their forward ends as at 22 and appropriately held by suitable tying means 24, the latter being tightly bound or wrapped around the hackle and the shank to define a forwardly tapering or conical-shaped ferrule.

Figure 4:
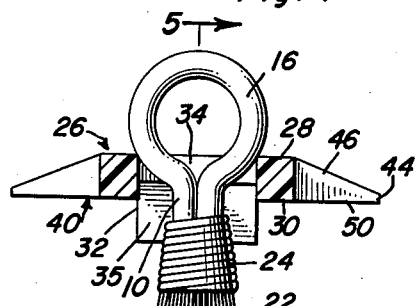
FIGURE 4 is a view wherein the weed guard, appearing in section and elevation, is removably attached to the eye-equipped shank of the fly.
Figure 5:
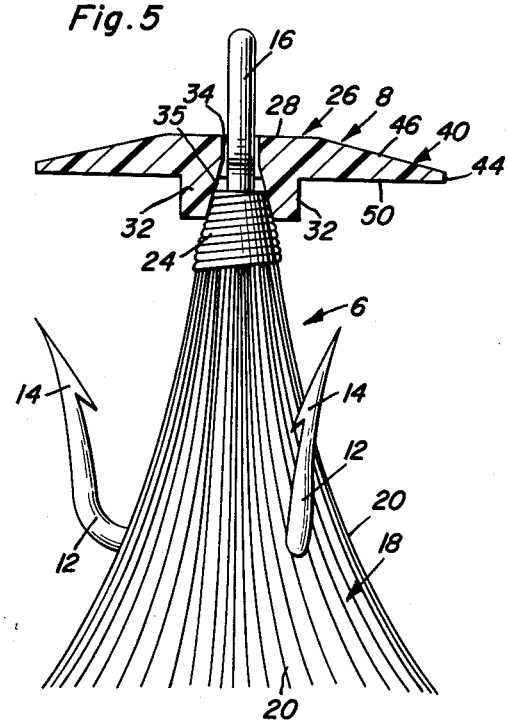
FIGURE 5 is a section on the plane of the section line 5—5 of FIGURE 4 looking in the direction of the indicating arrows.
Figure 5:
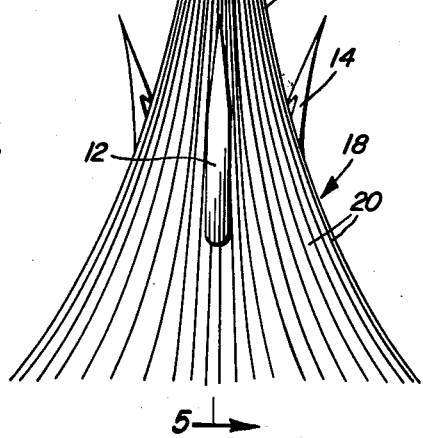

The star-like rubber or plastic weed guard 8 comprises a circular hub-like body 26 which has a substantially planar or flat forward face or surface 28 and a spaced parallel flat but annular rearward surface 30. The rearward surface is provided with a pair of integral rearwardly directed diametrically opposite segmental-shaped lugs 32 which are provided with opposed rearwardly diverging or sloping surfaces 35 which define a tapering space therebetween and into which the leading half-portion of the wound ferrule 24 is wedged and frictionally fitted. The axial or central part of the body or hub is provided with a linearly straight keeper slot 34 which is of a length equal to the lengthwise or cross-sectional dimension of either of the aforementioned lugs 32. The end portions of the slot are denoted at 36. This slotted lug-equipped hub or body can be yieldingly wedged into position over the eye so that when the component parts are assembled in the manner shown in FIGS. 4 and 5 the ferrule 24 is wedged in the space between the lugs and a substantial portion of the eye 16 is wedged or jammed into the end portion 36 of the slot 34. Consequently the body can be applied to or removed from the eye in an obvious manner. The peripheral surface 38 of the hub is provided at equidistant circumferentially spaced points with outstanding or radially projecting bendably resilient guard fingers 40.

The fingers 40 are alike in construction and each finger is generally triangulate in side elevation. More specifically the inner wider end of each finger denoted at 42 is integral with the peripheral surface and the outer end 44 is free and blunt. The forward lengthwise edge 46 slopes outwardly and rearwardly with the inner end 48 merging into the surface 28. The other lengthwise edge 50 is substantially straight and may be considered as flat and in a plane common with the plane of the planar rear surface 30. It follows that the inner end portions 42 of the fingers 40 are approximately of a cross-section equal to the thickness or cross-section of the hub-like body 26.

The fly equipped with the star-like guard (in the manner illustrated in FIGURES 4 and 5) provides a unique combination characterized chiefly by the treble hook and which renders the hooks substantially weedless. The circumferentially spaced radial fingers 40 are resilient to the extent that they are sufficiently pliant to flex if in the course of use they are unavoidably struck against rocks or immovable or embedded objects. The reach of the fingers in a radial direction from the center of the hub-like body is such that the fingers span a space which is amply large to forestall weeds lodging themselves on the barbed points under ordinary circumstances. Therefore, the hooks are prevented from fouling. However and at the same time the tines or fingers do not interfere with the fisherman's effort to effectively sink or embed the hook into the fish with expected certainty.

It is believed that a careful consideration of the specification in conjunction with the views of the drawing will enable the reader to obtain a clear and comprehensive understanding of the invention, the features and advantages thereof, the manner of applying and removing the guard. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In combination, a weed guard generally star-like in overall appearance, said guard embodying a body portion constituting a hub, said body portion being substantially circular in plan and having an outer peripheral surface, also having an elongated centrally located slot, said slot having lengthwise portions thereof opening through the respective top and bottom sides of said body, said peripheral surface being provided with equidistant circumferentially spaced guard fingers secured at inner ends to the peripheral surface projecting radially and outwardly therefrom, said fingers being bendably resilient, a fishing fly comprising a fishhook having a shank provided with a line-attaching eye, said eye being of an outside diameter greater than the length of said slot, said shank passing through and beyond said slot and a portion of the eye at an end of the shank being lodged and retentively seated in said slot, said fly having hackle covering and concealing the shank, the hackle at a place adjacent to the locale of said eye being tightly wrapped around the shank and secured in place by windings and providing a ferrule, and means carried by a central bottom side of said body and securing the ferrule and also the eye in place relative to said body, said means comprising a pair of projecting lugs which are integral with said bottom face, said lugs being of a length equal to the length of the slot and having opposed sloping surfaces defining a space between themselves, said ferrule being forcibly fitted into said space and wedged between and frictionally retained by said lugs and the opposed sloping surfaces.

2. For use on and in conjunction with a fishing fly having fishhook means with a shank and an eye at one end of the shank and hooks at the other end of the shank and hackle on the shank, the hackle having an attaching ferrule adjacent the juncture of the shank and eye, a star-like weed guard comprising a generally circular hub-like body having an outer peripheral edge, having circumferentially spaced bendably resilient fingers radiating from said peripheral surface, said fingers having planar bottom sides substantially flush with the coacting planar bottom side of said hub-like body, said hub-like body having an elongated slot of a width conformable with the cross-sectional dimension of the eye which is to be fitted therein, the length of said slot being proportional with the outside diameter of the eye and permitting the eye to be wedged and frictionally lodged and held in the slot with the shank passing through the slot and beyond the bottom side of said hub-like body, and a pair of companion lugs, said lugs being of segmental form and integral with the bottom side of said body and being of a length commensurate with the length of said slot, said lugs having opposed spaced-apart sloping surfaces, said surfaces defining a space therebetween, said space being designed and adapted to permit a cooperating ferrule on the fly to be wedge-fitted and frictionally held in place between the lugs.

References Cited in the file of this patent
UNITED STATES PATENTS

| | | |
|---|---|---|
| 539,149 | Shattuck | May 14, 1895 |
| 1,635,644 | Sloan | July 12, 1927 |
| 2,589,435 | Roeben | Mar. 18, 1952 |
| 2,618,094 | Schindler | Nov. 18, 1952 |